United States Patent [19]

Pedersen et al.

[11] 3,803,351

[45] Apr. 9, 1974

[54] DISC EJECT AND BRAKE MECHANISM FOR A VIDEO DISC PLAYER

[75] Inventors: Charles R. Pedersen, Elgin; David S. Stewart, Palatine, both of Ill.

[73] Assignee: Zenith Radio Corporation, Chicago, Ill.

[22] Filed: Aug. 1, 1972

[21] Appl. No.: 277,029

[52] U.S. Cl................... 178/6.6, 274/39 R, 274/1 D
[51] Int. Cl.......................... H04m 1/22, G11b 17/00
[58] Field of Search..... 178/6.6 TP, 6.6 DD, 6.6 FS; 274/4 H, 4 J, 39, 1 D

[56] References Cited

UNITED STATES PATENTS 2,228,931 1/1941 Rysick.............................. 274/39 R
1,370,266 3/1921 Bartolomeh........................ 274/1 D

*Primary Examiner*—Gareth D. Shaw
*Attorney, Agent, or Firm*—C. J. O'Connor; N. A. Camasto; J. J. Pederson

[57] ABSTRACT

A combination brake and disc ejector assembly for a disc playback deck wherein the disc drive hub is braked to stop disc rotation while the edge of the disc is simultaneously lifted to facilitate removal of the disc from the deck.

6 Claims, 2 Drawing Figures

DISC EJECT AND BRAKE MECHANISM FOR A VIDEO DISC PLAYER

CROSS REFERENCE TO RELATED APPLICATION

The invention of this application is related to subject matter disclosed and claimed in an application of David S. Stewart, Ser. No. 277,074, filed Aug. 1, 1972 and assigned to the same assignee of the present invention.

BACKGROUND OF THE INVENTION

The present invention is directed to disc playback systems, and more particularly to a combination brake and disc ejector assembly for a video disc playback deck.

With recent advances in television receivers, and their increased use for educational, as well as entertainment purposes, a demand has arisen for an economical and efficient means for storing and playing back prerecorded video programs. One particularly advantageous medium for this purpose is the vinyl disc, which is extremely economical to manufacture and which can be readily duplicated in large quantities by means of a pressing operation similar to that employed for conventional phonograph records. Unfortunately, the information density required of a vinyl disc to obtain reasonable picture resolution and color fidelity dictates an extremely finely grooved modulation track on the record surface. This precludes the use of a conventional pickup configuration wherein the disc lies flat on a rotating turntable and a pivotably mounted tone arm tracks the spiral grooves of the discs because of the high tracking force required to move the tone arm. The allowable tracking force for a video disc of the contemplated structure is extremely small, making the conventional tone arm, which tracks at pressures generally in excess of 1 gram, completely unworkable.

A carriage type configuration, wherein the pickup and stylus are carried by a carriage and the spinning disc is supported by an air cushion formed between the disc and the playback deck surface, presents one solution. This is accomplished by manufacturing the disc of a very thin layer of vinyl and rotating it at a high rate of speed, on the order of 1,800 RPM. The use of such thin material makes the disc difficult to grasp on a flat surface and hence difficult to remove from the playback deck. Furthermore, the high rotational speed necessitates a long wait for the disc to coast to a stop after each play.

SUMMARY OF THE INVENTION

Accordingly, it is a general object of the present invention to provide a new and improved combination brake and ejector assembly for facilitating removal of a video disc from a video disc playback deck.

The invention is directed to a combination brake and disc ejector assembly for a playback deck of the type adapted to play back a thin flexible disc rotating above a fixed deck surface. The assembly includes means comprising a drive line for rotating the disc, a pivoted brake arm having a brake shoe at one end for bearing against the drive line, and a pivoted lift arm having one end disposed under the edge of the disc. Disc ejecting means are provided for simultaneously actuating the brake arm and the lift arm to stop rotation of the disc and raise the edge of the disc for removal from the playback deck.

BRIEF DESCRIPTION OF THE DRAWINGS

The features of the present invention which are believed to be novel are set forth with particularity in the appended claims, and the invention, together with further objects and advantages thereof, may be understood by reference to the following description taken in connection with the accompanying drawings, in which:

DESCRIPTION OF THE PREFERRED EMBODIMENT

Figure 1:
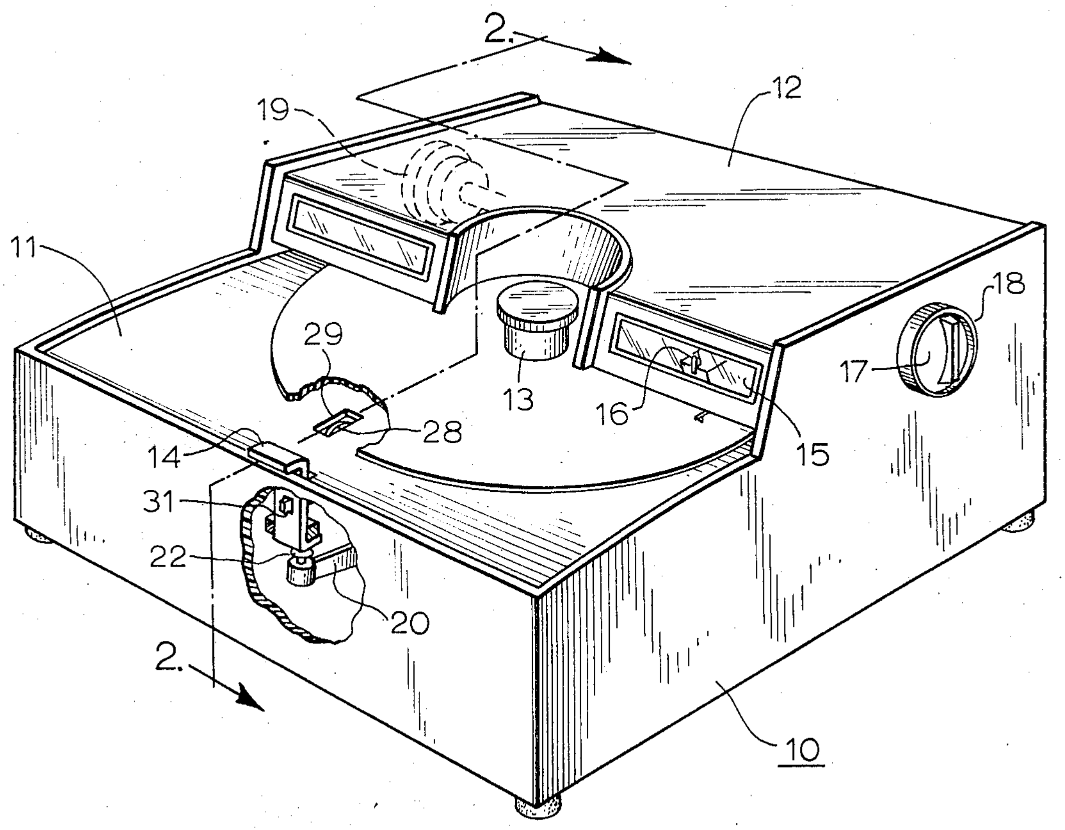
FIG. 1 is a perspective view of a video disc playback deck incorporating the present invention.

Referring to FIG. 1, the brake and disc ejector assembly of the invention is shown in the embodiment of a video disc playback deck. The playback deck comprises a housing 10 having a deck portion 11 and a cover 12 partially overlying the deck. There is no turntable as such, but instead a hub assembly 13, to which the thin vinyl discs for which the playback deck is designed are attached. The hub assembly turns at a sufficiently high rate of speed, in practice on the order of 1,800 RPM, to cause the vinyl disc to fly, i.e., leave the deck surface and suspend itself on a cushion of air. To aid this phenomenon, the deck may be curved away from the hub assembly as shown in FIG. 1.

A window 15 contained in the front lip of the deck lid serves in conjunction with a pointer 16 to indicate the position of the pickup stylus relative to the disc. A stylus raise-lower control 17 is contained on the right side of the housing to accomplish engagement and disengagement of the stylus from the disc. A manual positioning control 18, concentric with stylus raise-lower control 17, permits the stylus to be accurately positioned at any desired location over the disc. The left side of the housing contains a mode selection control 19, which enables operator selection of the off-on and pause modes. This switch is preferably interlocked with the stylus raise-lower control 17 to insure that the stylus will be retracted from the disc during insertion and removal of discs, storage of the playback deck and manual positioning of the stylus.

Figure 2:
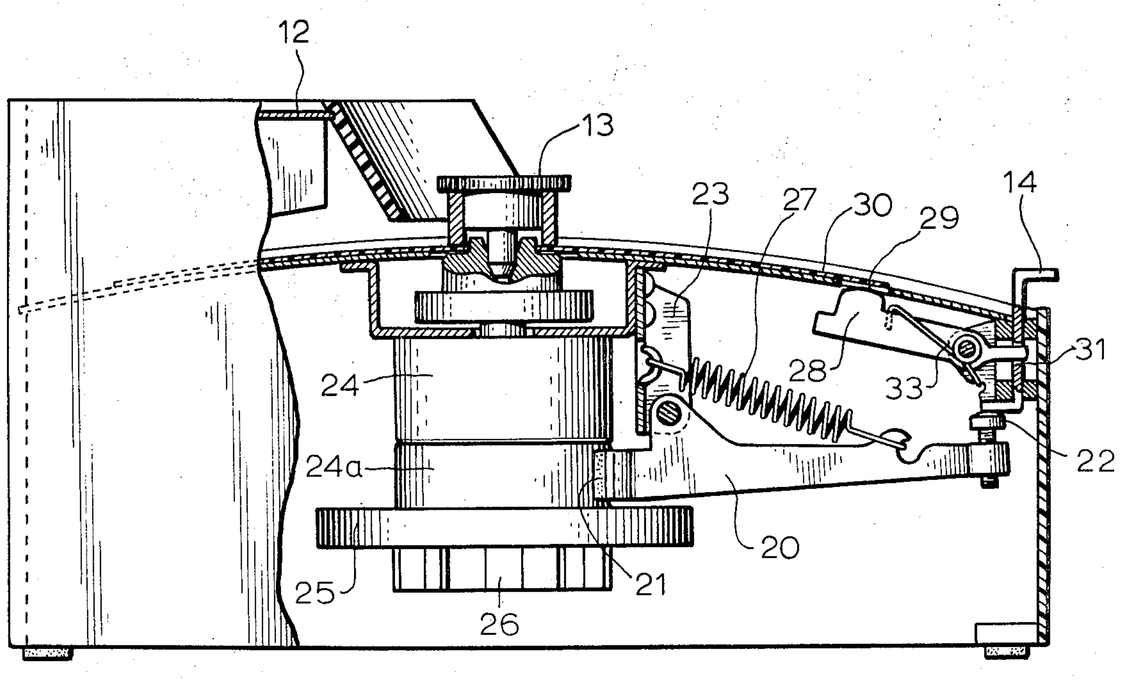
FIG. 2 is a cross-sectional view of the video disc playback deck of FIG. 1 showing a combination brake and disc ejector assembly constructed in accordance with the invention.

In accordance with the invention, a combination brake and disc ejector control lever 14 is provided to facilitate removal of discs by bringing the spinning hub assembly to an abrupt stop and lifting the edge of the disc nearest the operator away from the deck surface. Referring to FIG. 2, the assembly associated with this control is seen to comprise a brake lever 20 having a brake shoe 21 mounted at one end and an adjustable actuating stop 22 at its other end. The brake arm is pivotably mounted to a bracket 23, which in turn is mounted to a motor support bracket on the playback deck housing 10.

Hub assembly 13 is carried on the shaft of a motor 24, which is preferably a hysteresis synchronous type for maximum speed stability and minimum flutter. As shown, motor 24 has an external rotating armature 24*a*. A flywheel 25 and a ventilating fan 26 are also carried on the shaft of motor 24; the combination forming a drive line for hub assebly 13. Brake shoe 21 is disposed on arm 20 so that it can be brought to bear against the external armature of motor 24 to obtain the desired braking action. One end of a spring 27 is connected to arm 20 between its pivot point and stop 22, and the other end is attached to bracket 23. This spring biases arm 20 so that in normal operation brake shoe 21 is held away from the armature of motor 24.

The brake and disc ejector assembly of the invention further includes a lifter arm 28 pivotably mounted to housing 10. One end of this arm is designed to extend upward through an aperture 29 in deck 11 and into contact with the underside of the video disc 30. The other end comprises a tab-like surface which is operationally engaged by a slot 31 contained on ejector control lever 14.

The ejector control lever is slidably mounted in housing 10 and its other end is bent at right angles to form an appropriate actuating surface for engaging stop 22. Although spring 27 is provided to bias brake arm 20 into engagement with ejector control lever 14, and in so doing biases lever 14 into its non-actuated position, an additional wire spring 33 may be provided about the pivotal axis of lifter arm 28 to insure that arm 28 will be firmly retained in its retracted position except during actuation of lever 14.

In operation, when the operator pushes ejector control lever 14 against stop 22, brake shoe 21 contacts the external rotating armature 24*a* of motor 24, quickly bringing hub assembly 13 to a stop. At the same time, slot 31 actuates lifter arm 28 and moves its free end up through aperture 29 to lift disc 30 away from deck 11. This enables the edge of the disc to be conveniently grasped by the operator from the front of the playback deck and thus to be easily removed.

Thus, novel apparatus has been shown for aiding the removal of a thin vinyl video disc from a video disc playback deck. In so doing the apparatus prevents damage to the disc and adds significantly to operator convenience. The apparatus requires only three moving parts, and a single coil spring serves both to bias the brake shoe and to maintain the actuator in a non-actuated position.

While particular embodiments of the invention have been shown and described, it will be obvious to those skilled in the art that changes and modifications may be made thereto without departing from the invention in its broader aspects and, therefore, the aim in the appended claims is to cover all such changes and modifications as fall within the true spirit and scope of the invention.

What is claimed is:

1. In combination with a playback deck of the type adapted to play back a flexible disc rotating above a fixed surface: drive line means for rotating said disc; brake means supported adjacent said drive line means for engagement therewith; lift means disposed adjacent the edge of said disc; and means for actuating said brake means and said lift means simultaneously to stop rotation of said disc and to raise said disc edge above said fixed surface to facilitate removal of said disc.

2. The combination as set forth in claim 1, wherein said drive line means include a brake surface and said brake means comprise a brake shoe adapted to bear against said brake surface.

3. The combination as set forth in claim 2, wherein said brake means comprise a pivotably mounted brake arm with said brake shoe mounted on one end thereof; and wherein said lift means comprise a pivotably mounted lift arm having one end disposed underneath said disc.

4. The combination as set forth in claim 3, wherein said disc ejection means comprise a slidably mounted actuator bar having a first end extending through said deck surface for user actuation, means engaging the other end of said lift arm, and a second end engageable with the other end of said brake arm.

5. The combination as set forth in claim 4, wherein said actuator bar has actuated and non-actuated positions, and wherein said brake arm is spring biased against the end of said actuator bar to bias said actuator bar into said non-actuated position.

6. The combination as set forth in claim 2, wherein said drive line means includes a drive motor of the type having an external rotating armature, said brake shoe bearing against said armature, when engaged.

* * * * *